United States Patent [19]

Matsubara

[11] Patent Number: 4,491,394
[45] Date of Patent: Jan. 1, 1985

[54] IMAGE-FORMING LENS SYSTEM
[75] Inventor: Masaki Matsubara, Hachiouji, Japan
[73] Assignee: Olympus Optical Co., Ltd., Tokyo, Japan
[21] Appl. No.: 381,886
[22] Filed: May 25, 1982
[30] Foreign Application Priority Data
 May 26, 1981 [JP] Japan .................................. 56-79919
[51] Int. Cl.³ ............................................... G02B 9/12
[52] U.S. Cl. .................................. 350/414; 350/474; 350/477
[58] Field of Search ........................ 350/414, 474, 477

[56] References Cited
U.S. PATENT DOCUMENTS

| | | | |
|---|---|---|---|
| 2,440,088 | 4/1948 | Grey | 350/453 |
| 3,176,583 | 4/1965 | Klein | 350/414 |
| 3,355,234 | 11/1967 | Muller | 350/414 |
| 3,471,218 | 10/1969 | Benford et al. | |

*Primary Examiner*—John K. Corbin
*Assistant Examiner*—Rebecca D. Gass
*Attorney, Agent, or Firm*—Cushman, Darby & Cushman

[57] ABSTRACT

An image-forming lens system comprising a front lens group having a positive refractive power and consisting of a positive lens component and a negative lens component or consisting of a positive lens component and a cemented lens component consisting of a positive lens element and a negative lens element cemented with each other, and a rear lens group having a negative refractive power and being a single lens component or a cemented lens component consisting of a negative lens element and a positive lens element cemented with each other or consisting of a negative lens element and a positive lens element separated from each other. The entire lens system has a positive power and satisfies the conditions necessary for a microscopic objective and can relay an image without impairing the image performance of the objective.

8 Claims, 7 Drawing Figures

FIG. 6
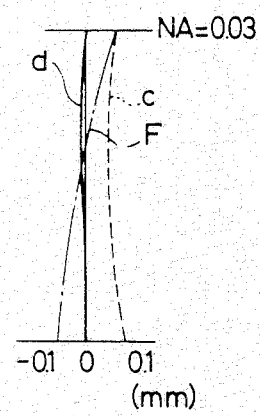
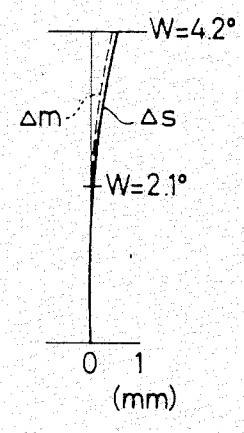
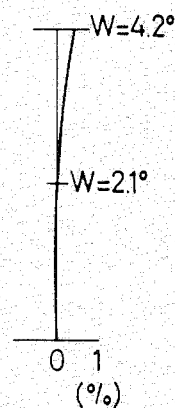
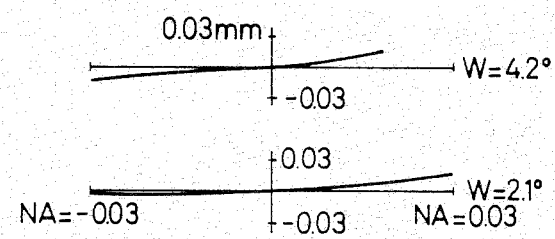

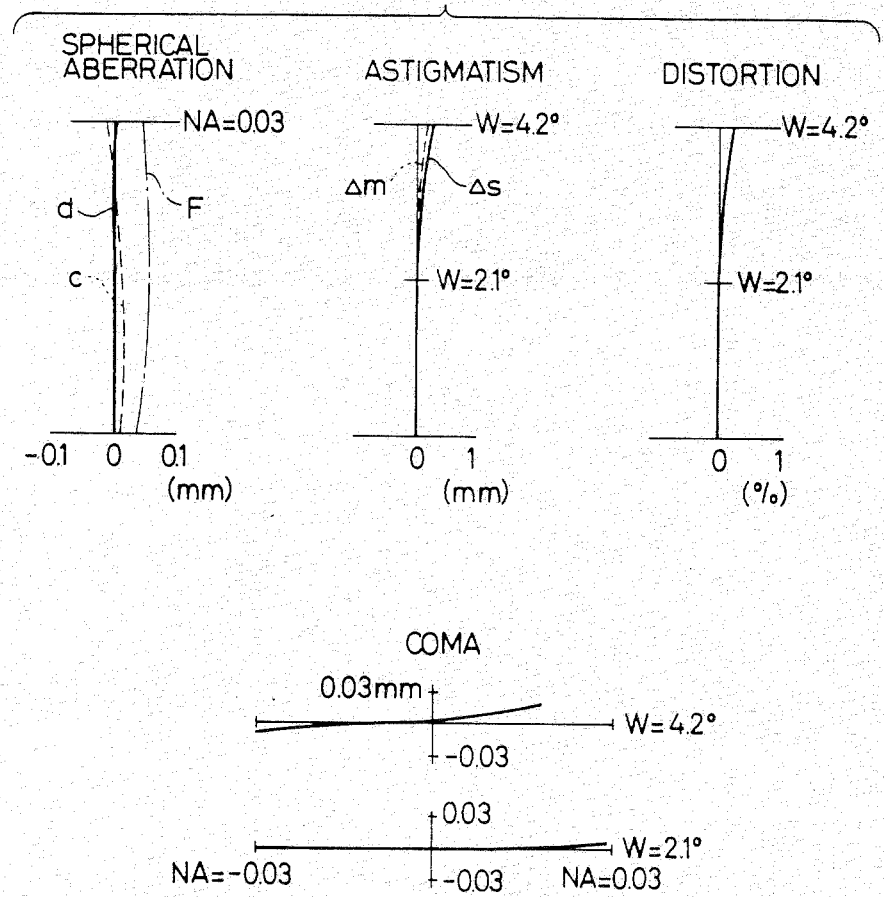

IMAGE-FORMING LENS SYSTEM

BACKGROUND OF THE INVENTION (a) Field of the Invention

This invention relates to an image forming lens system for microscopic objectives of an infinite distance design to be used for the observation of a metal phase system or the like.

The conventional image forming lens systems of this kind is mostly of such formation as is shown in FIG. 1. That is to say, as in FIG. 1, it consists of two lens elements $L_1$ and $L_2$ between which there is only a slight air space. Therefore, in the conventional image forming lens system, the exit pupil is in a position so comparatively far away from the lens element $L_1$ is to the left in the drawing that the light bundle will become so large as to produce a phenomenon of a part of the light bundle being cut after this image forming lens system. In such case, in order that the light bundle may not be cut, the optical system must be made larger, for example, the lens diameter must be made larger. Further, the pupil will separate so far away from the lens that asymmetrical comas will be generated. Further, as this kind of image forming lens system is a lens system for forming the image of a microscopic objective designed for an infinite distance, it has not only an image forming action but also an action of determining the position of the exit pupil of the objective within a predetermined range. Further, if the image forming position is far away, the observing position will be away from the microscope body (the eye point will become higher) and will become so hard to see that it will be necessary to form the image as near as possible. In fact, from the requirement in the structure of the microscope body, the image forming position is not the image position (back focus position) determined most naturally on the basis of the focal distance of the lens system but must be shorter than that and is of a lens system of a so-called telephoto ratio $P = 0.7$ to $0.8$.

SUMMARY OF THE INVENTION

An object of the present invention is to provide an image forming lens system which meets the requirements necessary for an image forming lens system for microscopic objectives of such infinite distance design as in the above and has a performance for being able to make an image relay without impairing the image performance of an objective.

The image forming lens system according to the present invention is made a positive image forming system as a whole of a positive-negative two-group system in which the front group has a positive power and the rear group has a negative power without greatly sliding the exit pupil position and in order to shorten the rear side focus position (back focus position).

The image forming lens system of the present invention is of such formation as is shown, for example, in FIGS. 2 to 4 in which the front lens group is formed of a positive lens component ("second lens component" in the claims); and a negative lens component (FIG. 2) ("first lens component" in the claims); or of a lens component made by cementing a positive lens element and a negative lens element with each other and a positive lens component arranged on its objective side (FIGS. 3 and 4) and the rear lens group ("third lens component" in the claims) is formed of one negative lens component (FIGS. 2 and 3), of a negative lens component consisting of a positive lens element and a negative lens element cemented with each other (FIG. 4) or of a lens component consisting of two lens elements separated from each other and having a negative refractive power as a whole (illustrated by the chain line in FIG. 4).

This image forming lens system forms an image of infinite distance by the objective in a predetermined position and, at the same time, receives the exit pupil (which is generally at about 90 mm. to the left of the image forming lens system) of the objective with its front group. However, the exit pupil position greatly slides to the right and is therefore made to be returned near to the original position by its rear group. At this time, simultaneously in consideration of the predetermined back focus position, the lens system is made a telephoto type lens system in which the principal point has moved to the left. Therefore, if the entire power, the space between the front group and rear group and the distance to the image position are determined, the power of the front group and rear group will be directly determined.

Here, in case the front group is formed of one positive lens component, it will be good in the paraxial range. However, in consideration of the offaxial aberration and particularly the symmetry of comas, in the present invention, the front group is provided with a negative lens component so that the upper light of the principal light may tend to be dispersed.

Generally, as in the later shown Embodiment 1 (the lens formation shown in FIG. 2), when there is some space between the front group and rear group, the powers of the front group and rear group will not become too strong, the generation of the aberration will be little, the principal plane will move to the left. It is preferable. However, the entire lens system will become longer. Therefore, it is preferable to reduce the space between the front group and rear group to make the structure compact. As the rays are not parallel, if such parallel plane plate as a filter is inserted in the air space, the image point will move. It is not preferable. Therefore, it is not considered in fact to insert here a filter or the like. Therefore, as in the later shown Embodiments 2 (FIG. 3) and 3 (FIG. 4), the space between the front group and rear group can be made small to compact the lens system. If the lens system is thus compacted, the powers of the respective groups will become stronger. Therefore, in the front group, the curvature of the convex surface will become stronger and therefore its correction will be borne by the two lens components. Further, if the air space reduces, the correction of the chromatic aberration of the magnification will become so difficult as to require cemented surfaces.

For such reasons as in the above, the image forming lens according to the present invention is of such formation as is shown in FIGS. 2 to 4 and is made to satisfy the respective conditions shown in the following:

$$0.8 < \frac{f_{12}}{|f_3|} < 1.4 \quad (1)$$

$$1 < \frac{100 d_4}{f} < 10 \quad (2)$$

$$10 < \frac{r_6}{n_3 - 1} < 30 \quad (3)$$

$$r_6 < |r_4| \quad (4)$$

$$0.4 < \frac{f_1}{|f_3|} < 2.0 \quad (5)$$

wherein the reference symbol f represents the focal length of the entire system, $f_1$ represents the focal length of the lens component on the object side of the front group, $f_{12}$ represents the focal length of the front group, $f_3$ represents the focal length of the rear group, $r_4$ represents the radius of curvature of the surface on the most image side of the front group, $r_6$ represents the radius of curvature of the surface on the most image side of the rear group, $d_4$ represents the air space between the front group and rear group and $n_3$ represents the refractive index of the rear group (or of its image side lens element in case the rear group consists of a cemented lens component).

The meanings of the above mentioned conditions shall be explained in the following.

The condition (1) defines the power distribution between the front group and rear group. This power distribution is determined by the displacement of the pupil and how short the back focus position is made and also in consideration of the balance of the aberration corrections. If the lower limit of this condition is exceeded, the power of the front group will be too strong to correct the spherical aberration and the power of the rear group will become so weak that the pupil will not be in the predetermined position. If the upper limit is exceeded, the curvature of the surface of the rear group or particularly of its rearmost surface will become so strong that the comas will be unbalanced.

The condition (2) is to regulate the air space between the front group and rear group. If the lower limit of this condition is exceeded, the power of each of the front group and rear group will become strong, the curvature of each surface of the lens will become strong, the aberration correction will become difficult and particularly the symmetry of the comas will be no longer kept. If the upper limit is exceeded, the entire lens system will become so long as to exceed the limit in the structure, further the pupil position and back focus position will not be within the predetermined range. It is not desirable.

The condition (3) relates to the radius of curvature of the rearmost surface of the rear group. When the curvature of this surface becomes so strong as to exceed the lower limit of this condition, a spherical aberration will be generated on the above mentioned surface and, even if it is attempted to correct this spherical aberration with the convex surface of the front group, it will not be able to be corrected. Further, the amount of the coma will increase. On the other hand, if the upper limit is exceeded, the aberrations will be well balanced but the required telephoto ratio will not be taken and the pupil position and back focus position will not be within the predetermined range.

The condition (4) shows the ratio of the burden on the rearmost surface $r_6$ of the rear group to the burden on the rearmost surface $r_4$ of the front group. If the rearmost surface $r_4$ of the front group is burdened so much as not to satisfy this condition (4), the work of the inherent positive power will reduce from the relation having the positive power as a whole in the lens system and will not be balanced. That is to say, the surface of the rear group should be burdened with the negative power. Further, if the rearmost surface $r_4$ of the front group is burdened, the front group and rear group will contact with each other on the periphery of the lens, therefore the air space between the front group and rear group will not be able to be made smaller and the entire system will not be able to be made shorter. It is not desirable to the arrangement of the lenses. Therefore, in the present invention, as shown by the condition (4), the curvature of the surface $r_6$ is made larger than the curvature of the surface $r_4$.

The condition (5) is to recruit the role of the condition (1) and to make it more effective. If the lower limit of this condition is exceeded, the positive power of the front group will become so strong that the spherical aberration will be over-corrected. If the upper limit is exceeded, the negative power of the rear group will become so strong that the spherical aberration will be under-corrected and, at the same time, the comas will be unbalanced.

BRIEF DESCRIPTION OF THE DRAWINGS

FIGS. 5 to 7 are aberration curve diagrams respectively of Embodiments 1 to 3 of the present invention.

DESCRIPTION OF THE PREFERRED EMBODIMENTS

Respective embodiments of the image forming lens system of the present invention explained in the above shall be shown in the following:

Embodiment 1:
f = 100
$r_1$ = 16.398
$d_1$ = 2.22      $n_1$ = 1.488      $\nu_1$ = 70.2
$r_2$ = −68.186
$d_2$ = 1.11
$r_3$ = −31.942
$d_3$ = 1.11      $n_2$ = 1.740      $\nu_2$ = 28.3
$r_4$ = −67.900
$d_4$ = 8.33
$r_5$ = 24.407
$d_5$ = 1.00      $n_3$ = 1.488      $\nu_3$ = 70.2
$r_6$ = 10.912
Object Position ∞,
Pupil Position −51.7,
Image Position 66.1

Embodiment 2:
f = 100
$r_1$ = −1010.977
$d_1$ = 1.39      $n_1$ = 1.639      $\nu_1$ = 55.4
$r_2$ = −29.922
$d_2$ = 0.28
$r_3$ = 9.319
$d_3$ = 2.50      $n_2$ = 1.639      $\nu_2$ = 55.4
$r_3'$ = −15.701
$d_3'$ = 0.89     $n_2'$ = 1.596     $\nu_2'$ = 39.2
$r_4$ = 19.347
$d_4$ = 1.33
$r_5$ = −56.805
$d_5$ = 1.55      $n_3$ = 1.589      $\nu_3$ = 53.2
$r_6$ = 7.979
Object Position ∞, Pupil Position −50.8, Image Position 66.2

Embodiment 3:
f = 100
$r_1$ = 23.702
$d_1$ = 2.08      $n_1$ = 1.603      $\nu_1$ = 60.7
$r_2$ = −125.711
$d_2$ = 0.35
$r_3$ = 16.565
$d_3$ = 3.47      $n_2$ = 1.603      $\nu_2$ = 60.7
$r_3'$ = −16.665

-continued

| | | |
|---|---|---|
| $d_3' = 0.69$ | $n_2' = 1.626$ | $\nu_2' = 35.7$ |
| $r_4 = 20.226$ | | |
| $d_4 = 1.39$ | | |
| $r_5' = -212.052$ | | |
| $d_5' = 2.78$ | $n_3' = 1.596$ | $\nu_3' = 39.2$ |
| $r_5 = -12.972$ | | |
| $d_5 = 1.25$ | $n_3 = 1.548$ | $\nu_3 = 62.8$ |
| $r_6 = 11.706$ | | |

Object Position $\infty$, Pupil Position $-40.3$, Image Position 63.7 wherein the reference symbols $r_1$ through $r_6$ represent the radii of curvature of the respective lens surfaces, $d_1$ through $d_5$ represent the thicknesses and air spaces of the respective lenses, $n_1$ through $n_3$ represent the refractive indices of the respective lenses and $\nu_1$ through $\nu_3$ represent the Abbe's numbers of the respective lenses.

In Embodiment 1 among the above respective embodiments, the front group is formed of a convex lens component and concave lens component and the rear group is formed of one concave lens component. In Embodiment 2, the front group is formed of a cemented lens component formed by cementing a convex lens element and a concave lens element with each other and a convex lens component added in front of it and the rear group is formed of one concave lens component. Further, in Embodiment 3, the front group consists of a convex lens component and cemented lens component of the formation similar to that in Embodiment 2 and the rear group is of a formation consisting of a cemented concave lens component.

Figure 1:
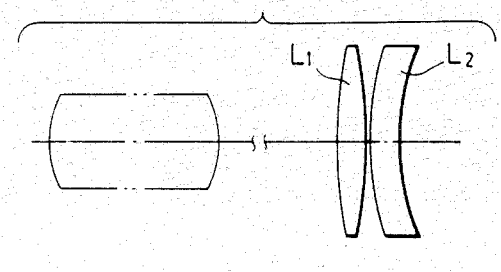
FIG. 1 is a sectional view showing a lens arrangement of a conventional image forming lens system.
Figure 2:
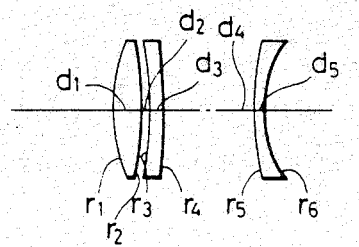
FIGS. 2 to 4 are sectional views showing respectively Embodiments 1 to 3 of an image forming lens system according to the present invention.
Figure 3:
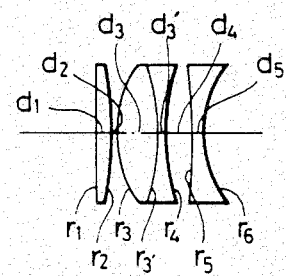
Figure 4:
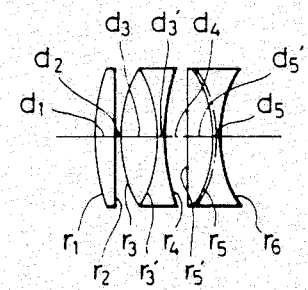
Figure 5:
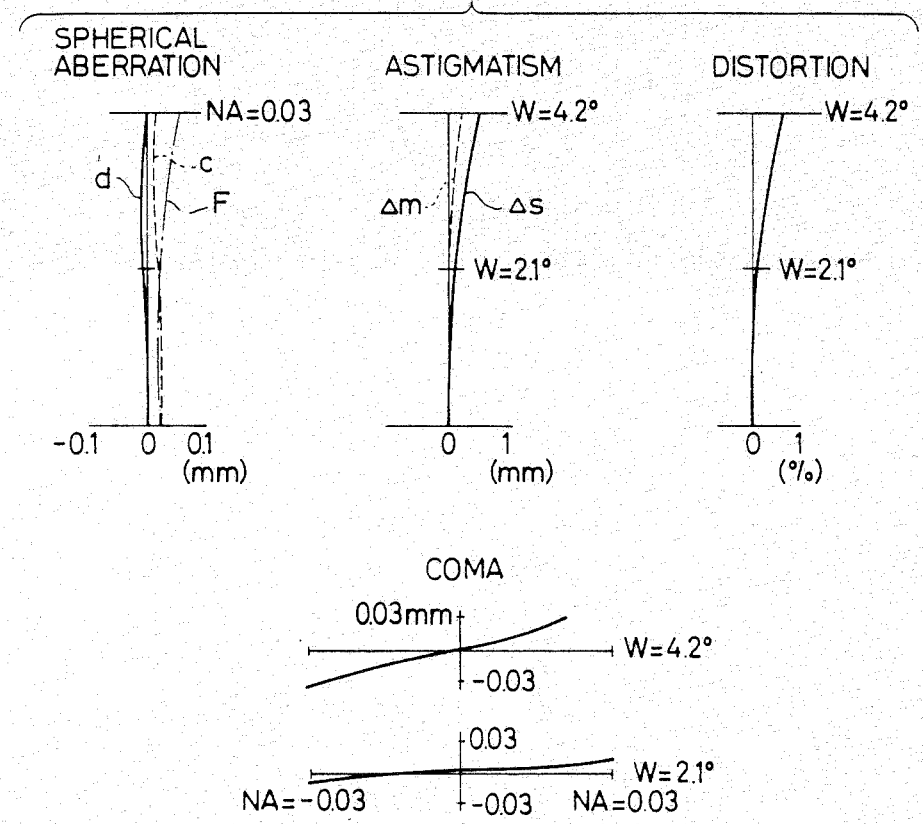

As an alternative arrangement, the rear group may be of a form of not only one concave lens component or a cemented concave lens component but also, for example, two lens elements to be cemented with each other as separated from each other as shown by the chain line in FIG. 4.

I claim:

1. An image-forming lens system for forming an image by a microscopic objective of infinite distance design, comprising:

a lens group consisting of a first lens component together with a second lens component and having a positive refractive power, and a third lens component having a negative refractive power, said lens system having a positive power as a whole and satisfying the following conditions:

(1) $0.8 < f_{12}/|f_3| < 1.4$
(2) $1 < 100 d_4/f < 10$
(3) $10 < r_6/(n_3-1) < 30$
(4) $r_6 < |r_4|$
(5) $0.4 < f_1/|f_3| < 2.0$ wherein the reference symbol f represents the focal length of the entire system, the reference symbol $f_1$ represents the focal length of said first lens component, the reference symbol $f_{12}$ represents the focal length of the lens group, the reference symbol $f_3$ represents the focal length of the third lens component, the reference symbol $r_4$ represents the radius of curvature of the surface on the image side of the second lens component, the reference symbol $r_6$ represents the radius of curvature of the surface on the image side of the third lens component, the reference symbol $d_4$ represents the airspace between the second and third lens components, and the reference symbol $n_3$ represents the refractive index of the lens nearest the image side of the third lens component.

2. An image-forming lens system according to claim 1 wherein said first lens component is a positive lens, said second lens component is a negative lens and said third lens component is a single lens.

3. An image-forming lens system according to claim 2 having the following numerical data:

| | | |
|---|---|---|
| $f = 100$ | | |
| $r_1 = 16.398$ | | |
| $d_1 = 2.22$ | $n_1 = 1.488$ | $\nu_1 = 70.2$ |
| $r_2 = -68.186$ | | |
| $d_2 = 1.11$ | | |
| $r_3 = -31.942$ | | |
| $d_3 = 1.11$ | $n_2 = 1.740$ | $\nu_2 = 28.3$ |
| $r_4 = -67.900$ | | |
| $d_4 = 8.33$ | | |
| $r_5 = 24.407$ | | |
| $d_5 = 1.00$ | $n_3 = 1.488$ | $\nu_3 = 70.2$ |
| $r_6 = 10.912$ | | |

Object Position $\infty$, Pupil Position $-51.7$, Image Position 66.1 wherein the reference symbols $r_1$ through $r_6$ represent the radii of curvature on the surfaces of the respective lenses, the reference symbols $d_1$ through $d_5$ represent the thicknesses of the respective lenses and airspaces therebetween, the reference symbols $n_1$ through $n_3$ represent the refractive indices of the respective lenses, and the reference symbols $\nu_1$ through $\nu_3$ represent the Abbe's numbers of the respective lenses.

4. An image-forming lens system according to claim 1 wherein said first lens component is a positive lens, said second lens component consists of a positive lens element and a negative lens element cemented to said positive lens element, and said third lens component is a single lens.

5. An image-forming lens system according to claim 4 having the followng numerical data:

| | | |
|---|---|---|
| $f = 100$ | | |
| $r_1 = -1010.977$ | | |
| $d_1 = 1.39$ | $n_1 = 1.639$ | $\nu_1 = 55.4$ |
| $r_2 = -29.922$ | | |
| $d_2 = 0.28$ | | |
| $r_3 = 9.319$ | | |
| $d_3 = 2.50$ | $n_2 = 1.639$ | $\nu_2 = 55.4$ |
| $r_3' = -15.701$ | | |
| $d_3' = 0.89$ | $n_2' = 1.596$ | $\nu_2' = 39.2$ |
| $r_4 = 19.347$ | | |
| $d_4 = 1.33$ | | |
| $r_5 = -56.805$ | | |
| $d_5 = 1.55$ | $n_3 = 1.589$ | $\nu_3 = 53.2$ |
| $r_6 = 7.979$ | | |

Object Position $\infty$, Pupil Position $-50.8$, Image Position 66.2 wherein the reference symbols $r_1$ through $r_6$ represent the radii of curvature on the surfaces of the respective lenses, the reference symbols $d_1$ through $d_5$ represent the thicknesses of the respective lenses and airspaces therebetween, the reference symbols $n_1$ through $n_3$ represent the refractive indices of the respective lenses, and the reference symbols $\nu_1$ through $\nu_3$ represent the Abbe's numbers of the respective lenses.

6. An image-forming lens system according to claim 1 wherein said first lens component is a positive lens, said second lens component consists of a first positive lens element and a first negative lens element cemented to said first positive lens element, and said third lens component consists of a second positive lens element and a second negative lens element cemented to said second positive lens element.

7. An image-forming lens system according to claim 6 having the following numerical data:

| | | |
|---|---|---|
| f = 100 | | |
| $r_1$ = 23.702 | | |
| $d_1$ = 2.08 | $n_1$ = 1.603 | $\nu_1$ = 60.7 |
| $r_2$ = −125.711 | | |
| $d_2$ = 0.35 | | |
| $r_3$ = 16.565 | | |
| $d_3$ = 3.47 | $n_2$ = 1.603 | $\nu_2$ = 60.7 |
| $r_3'$ = −16.665 | | |
| $d_3'$ = 0.69 | $n_2'$ = 1.626 | $\nu_2'$ = 35.7 |
| $r_4$ = 20.226 | | |
| $d_4$ = 1.39 | | |
| $r_5'$ = −212.052 | | |
| $d_5'$ = 2.78 | $n_3'$ = 1.596 | $\nu_3'$ = 39.2 |
| $r_5$ = −12.972 | | |
| $d_5$ = 1.25 | $n_3$ = 1.548 | $\nu_3$ = 62.8 |

-continued

| |
|---|
| $r_6$ = 11.706 |

Object Position ∞, Pupil Position −40.3, Image Position 63.7 wherein the reference symbols $r_1$ through $r_6$ represent the radii of curvature on the surfaces of the respective lenses, the reference symbols $d_1$ through $d_5$ represent the thicknesses of the respective lenses and airspaces therebetween, the reference symbols $n_1$ through $n_3$ represent the refractive indices of the respective lenses, and the reference symbols $\nu_1$ through $\nu_3$ represent the Abbe's numbers of the respective lenses.

8. An image-forming lens system according to claim 1 wherein said first lens component is a positive lens, said second lens component consists of a first positive lens element and a first negative lens element cemented to said first positive lens element, and said third lens component consists of a second positive lens element and a second negative lens element separated from said second positive lens element.

* * * * *